US008924417B2

(12) United States Patent
Choi (10) Patent No.: US 8,924,417 B2
(45) Date of Patent: Dec. 30, 2014

(54) CONTENT REPRODUCTION METHOD AND APPARATUS IN IPTV TERMINAL (75) Inventor: Hyung-tak Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1328 days.

(21) Appl. No.: 12/136,869

(22) Filed: Jun. 11, 2008

(65) Prior Publication Data
US 2009/0070375 A1 Mar. 12, 2009

(30) Foreign Application Priority Data
Sep. 11, 2007 (KR) .......... 10-2007-0092044

(51) Int. Cl.
G06F 17/30 (2006.01)
(52) U.S. Cl.
CPC .... G06F 17/30787 (2013.01); G06F 17/30825 (2013.01); G06F 17/3084 (2013.01)
USPC .......... 707/770; 707/708
(58) Field of Classification Search
USPC .......... 707/611, 999.203; 369/47.15; 386/68; 725/52; 352/1
See application file for complete search history.

(56) References Cited

U.S. PATENT DOCUMENTS

| 6,067,126 | A | 5/2000 | Alexander | |
|---|---|---|---|---|
| 6,510,279 | B1 * | 1/2003 | Morishita | 386/96 |
| 6,968,506 | B2 * | 11/2005 | Yacovone et al. | 715/730 |
| 7,272,558 | B1 * | 9/2007 | Soucy et al. | 704/235 |
| 7,499,104 | B2 * | 3/2009 | Cooper | 348/512 |
| 7,522,491 | B2 * | 4/2009 | Han et al. | 369/47.15 |
| 7,593,937 | B2 * | 9/2009 | Kang et al. | 1/1 |
| 7,616,128 | B2 * | 11/2009 | Ohno et al. | 340/904 |
| 7,903,510 | B2 * | 3/2011 | Han et al. | 369/47.15 |
| 7,920,931 | B2 * | 4/2011 | Van de Sluis et al. | 700/94 |
| 7,945,142 | B2 * | 5/2011 | Finkelstein et al. | 386/285 |
| 7,988,560 | B1 * | 8/2011 | Heller et al. | 463/42 |
| 8,677,409 | B2 * | 3/2014 | Yu | 725/45 |
| 2001/0049826 | A1 * | 12/2001 | Wilf | 725/120 |
| 2003/0033606 | A1 * | 2/2003 | Puente et al. | 725/110 |
| 2003/0160944 | A1 * | 8/2003 | Foote et al. | 352/1 |
| 2004/0085341 | A1 * | 5/2004 | Hua et al. | 345/723 |
| 2004/0086267 | A1 * | 5/2004 | Ogawa et al. | 386/95 |
| 2006/0015348 | A1 * | 1/2006 | Cooper et al. | 704/500 |
| 2006/0026646 | A1 * | 2/2006 | Lou et al. | 725/52 |
| 2006/0100882 | A1 | 5/2006 | Eves et al. | |

(Continued)

FOREIGN PATENT DOCUMENTS

JP 10271403 A 10/1998
KR 10-2001-0008797 A 2/2001

(Continued)

OTHER PUBLICATIONS

Communication, dated Jan. 19, 2012, issued by the Korean Intellectual Property Office in corresponding Korean Application No. 10-2007-0092044.

Primary Examiner — Debbie Le
(74) Attorney, Agent, or Firm — Sughrue Mion, PLLC (57) ABSTRACT An IPTV terminal is provided. It is possible to provide an additional service allowing a user to watch video content, in addition to a service for reproducing an audio file, by extracting metadata on the audio file if a reproduction command of the audio file is input, searching for the video content related to the audio file based on the extracted metadata, and receiving and reproducing the video content.

28 Claims, 8 Drawing Sheets

(56) References Cited

U.S. PATENT DOCUMENTS

| | | |
|---|---|---|
| 2006/0136556 A1* | 6/2006 | Stevens et al. ............... 709/203 |
| 2007/0028278 A1* | 2/2007 | Sigmon et al. ............... 725/113 |
| 2007/0168864 A1* | 7/2007 | Yamamoto et al. ........... 715/716 |
| 2007/0244902 A1* | 10/2007 | Seide et al. .................... 707/10 |
| 2008/0012985 A1* | 1/2008 | Yu et al. ........................ 348/515 |
| 2008/0168490 A1* | 7/2008 | Yu .................................. 725/32 |
| 2008/0180573 A1* | 7/2008 | Cooper et al. ................ 348/515 |
| 2008/0249982 A1* | 10/2008 | Lakowske ......................... 707/3 |
| 2008/0284910 A1* | 11/2008 | Erskine et al. ................ 348/468 |
| 2009/0055742 A1* | 2/2009 | Nordhagen .................... 715/716 |
| 2009/0162828 A1* | 6/2009 | Strachan et al. .............. 434/350 |
| 2009/0175590 A1* | 7/2009 | Ryu et al. ......................... 386/68 |
| 2010/0142624 A1* | 6/2010 | Fujita ....................... 375/240.25 |
| 2010/0182908 A1* | 7/2010 | Kim et al. ...................... 370/235 |
| 2011/0257772 A1* | 10/2011 | Kerber et al. ................... 700/94 |

FOREIGN PATENT DOCUMENTS

| | | |
|---|---|---|
| KR | 1020010008019 A | 2/2001 |
| KR | 1020010036962 A | 5/2001 |
| KR | 10-2001-0097459 A | 11/2001 |
| KR | 10-2001-0108147 A | 12/2001 |
| KR | 10-2005-0086942 A | 8/2005 |
| KR | 1020060007301 A | 1/2006 |

* cited by examiner

CONTENT REPRODUCTION METHOD AND APPARATUS IN IPTV TERMINAL

CROSS-REFERENCE TO RELATED PATENT APPLICATION

This application claims priority from Korean Patent Application No. 10-2007-0092044, filed on Sep. 11, 2007, in the Korean Intellectual Property Office, the disclosure of which is incorporated herein in its entirety by reference.

BACKGROUND OF THE INVENTION

1. Field of the Invention

The present invention relates to an Internet Protocol Television (IPTV), and more particularly, to a content reproduction method and apparatus in an IPTV terminal for reproducing an audio file and video content related thereto.

2. Description of the Related Art

An Internet Protocol Television (IPTV) provides an information service, moving picture content, and a broadcasting service by using the Internet. The IPTV is different from general internet television in that the IPTV uses a television instead of a computer monitor and is operated by a remote control instead of a mouse.

Figure 1:
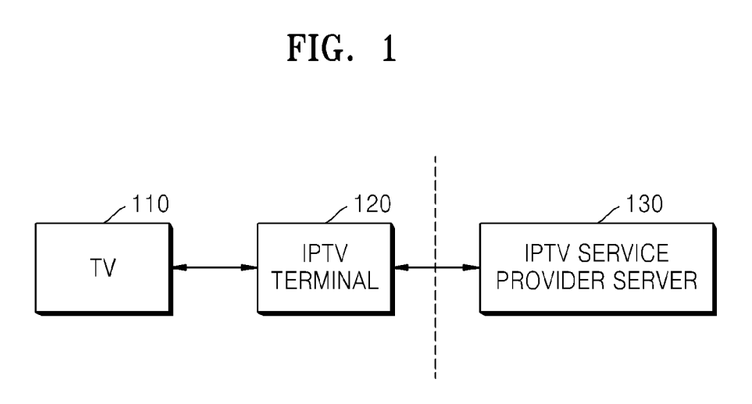
FIG. 1 schematically illustrates a configuration of a general IPTV system.

FIG. 1 schematically illustrates a configuration of a general IPTV system.

Referring to FIG. 1, the IPTV system includes a television 110, an IPTV terminal 120, and an IPTV service provider server 130.

The television 110 serves to receive and reproduce audio and video signals. The IPTV terminal (referred to as an 'IPTV set-top box') 120 receives various contents through an internet line and reproduces the various contents in the television 110. The IPTV terminal 120 is located inside or outside of the television 110. The television 110 and the IPTV terminal 120 are connected to each other through a cable. The IPTV terminal 120 may be connected to the IPTV service provider server 130 or public internet network through the internet line.

A user can use various internet services such as a moving picture content service by connecting the IPTV terminal 120 to the television 110. Accordingly, it is possible for a user who is not good at operating a computer to use various contents and additional services such as a movie service, a home shopping service, a home banking service, online games, and MP3 files provided through the Internet, in addition to a search service provided through the internet, by using a remote control.

The IPTV is similar to a general apparatus for providing cable broadcasting and satellite broadcasting contents in that the IPTV provides broadcasting contents. However, the IPTV is different from the general apparatus for providing cable broadcasting and satellite broadcasting contents in that the IPTV has bidirectionality. Unlike a general apparatus for providing sky wave broadcasting or satellite broadcasting contents, in the IPTV, it is possible for the user to watch a desired program at a desired time.

The IPTV provides functions such as an audio on demand (AOD) service, a video on demand (VOD) service, a multicast service, a local music file reproduction service, and a browsing service. Accordingly, the user may access the IPTV service provider server 130, receive the AOD service, and listen to music by using the IPTV. Alternatively, the user may reproduce a music file previously downloaded into an internal storage device and listen to music (reproduction of a local music file).

However, a display device of the IPTV is not used to reproduce the VOD or local music file in the IPTV terminal 120. Accordingly, it is desirable to provide additional services by using the display device, in addition to reproduction of an audio file by using the IPTV terminal 120, if the user reproduces the audio file.

SUMMARY OF THE INVENTION

The present invention provides a content reproduction method and apparatus in an IPTV terminal for searching for video content related to an audio file, if reproducing the audio file.

In the present invention, it is possible to provide additional services by using a display device in addition to a reproduction service of an audio file by extracting metadata on the audio file, searching for video content based on the metadata, and reproducing the video content.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 2:
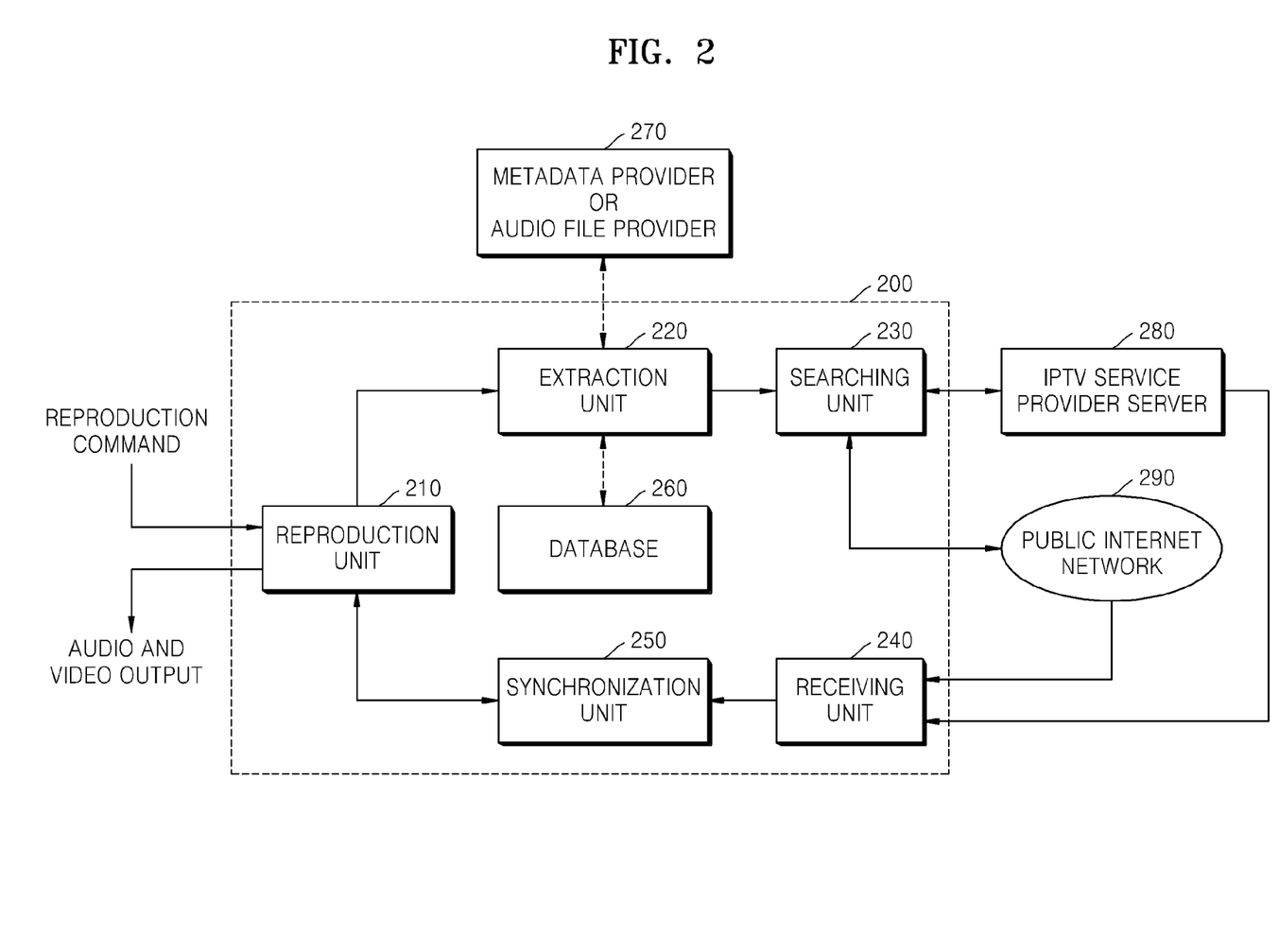
FIG. 2 is a functional block diagram illustrating a content reproduction apparatus in an IPTV terminal according a first exemplary embodiment of the present invention.

FIG. 2 is a functional block diagram illustrating a content reproduction apparatus in an IPTV terminal according a first embodiment of the present invention.

Referring to FIG. 2, a content reproduction apparatus 200 in the IPTV terminal includes a reproduction unit 210, an extraction unit 220, a searching unit 230, a receiving unit 240, and a synchronization unit 250.

After receiving a reproduction command from a user, the reproduction unit 210 reproduces an audio file that has been previously downloaded into a storage device (not shown) in the IPTV terminal or provided through an AOD service through a speaker of a television 110. In addition, the reproduction unit 210 receives video content from an IPTV service provider server 280 or a public internet network 290 through the receiving unit 240 and the synchronization unit 250 and reproduces the received video content through a screen of the television 110.

The extraction unit 220 extracts metadata on an audio file for which a reproduction command has been input from a user. The extraction unit 220 receives an audio file from the reproduction unit 210. The metadata on the audio file may be extracted from the audio file. In addition, in a modified embodiment, metadata on a plurality of audio files stored in the IPTV terminal may be managed as a database 260 in the IPTV terminal or stored and managed as a predetermined folder or file in a storage device (not shown) in the IPTV terminal. In this case, the extraction unit 220 may extract metadata from the database 260, the predetermined folder, or the predetermined file.

However, it is possible that the metadata may not be found in the audio file, the database 260, the predetermined folder, or the predetermined file. In addition, even if the metadata is found, the metadata may not include sufficient information. In this case, the extraction unit 220 may acquire all the extractable information on the audio file, access an audio file provider or metadata provider 270, and receive additional metadata.

The searching unit 230 searches for video content related to the audio file based on the metadata extracted by the extraction unit 220. For example, if the audio file is a music file, the video content related thereto may be a music video, a live broadcasting program of a singer, an original sound track video, or a broadcasting advertisement. The video contents related to the audio file are searched for in the IPTV service provider server 280 or public internet network 290.

In addition, if there are a plurality of video content items found in the IPTV service provider server 280 or the public internet network 290, the searching unit 230 may select a type of video content received from the IPTV service provider server 280 or public internet network 290 based on priority predetermined by the user. For example, if the found video content is a music video or a live broadcasting program of a singer, the searching unit 230 may select a music video so as to allow the music video to be transmitted to the receiving unit 240 based on the priority of the user.

In addition, the searching unit 230 may select video content based on resolution thereof. For example, if there are a plurality of music videos related to the same audio files, the searching unit 230 may select a music video with high resolution so as allow the music video with high resolution to be transmitted to the receiving unit 240.

The receiving unit 240 receives the video content selected by the searching unit 230 from the IPTV service provider server 280 or public internet network 290. Although the receiving unit 240 is shown as a function block separate from the searching unit 230 in FIG. 2, the receiving unit 240 need not be separate from the searching unit 230. In some embodiments, the receiving unit 240 may be included in the searching unit 230. Accordingly, the searching unit 230 and the receiving unit 240 need not be connected to the IPTV service provider server 280 or the public internet network 290 through respective internet lines. The searching unit 230 and the receiving unit 240 may be connected to the IPTV service provider server 280 or the public internet network 290 through a single internet line.

The receiving unit 240 receives the video content provided through the IPTV service provider server 280 or the public internet network 290 and transmits the video content to the synchronization unit 250. The receiving unit 240 can receive the video content through a downloading and storing process or a streaming process. For example, in a case where the streaming process is used, the video content received by the receiving unit 240 is transmitted to the synchronization unit 250 after buffering the video content. In a case where the downloading and storing process is used, the video content downloaded into the receiving unit 240 is stored in a storage device (not shown) in the IPTV terminal. The video content for which a storing process has been completed is transmitted to the synchronization unit 250 through the receiving unit 240.

The synchronization unit 250 synchronizes the video content received by the receiving unit 240 with the audio file. The audio file may be input into the reproduction unit 210. For example, if the video content is searched for while the audio file is being reproduced, the video content needs to be reproduced from a start point found by jumping a period equal to a period over which the audio file has been reproduced. The synchronization process may be performed in various manners. For example, it is possible to set a start time of the video content by using the current reproduction time of the audio file. In addition, it is possible to set a start time of the video content by comparing pitch information of the audio file with pitch information of the video content. The video content synchronized with the audio file is transmitted to the reproduction unit 210.

The reproduction unit 210 reproduces the audio file and the video content synchronized with the audio file. The audio file and a video component of the video content synchronized with the audio file may be reproduced. Alternatively, the reproduction of the audio file may be stopped, and the video and audio components of the video content synchronized with the audio file may be reproduced.

Figure 3:
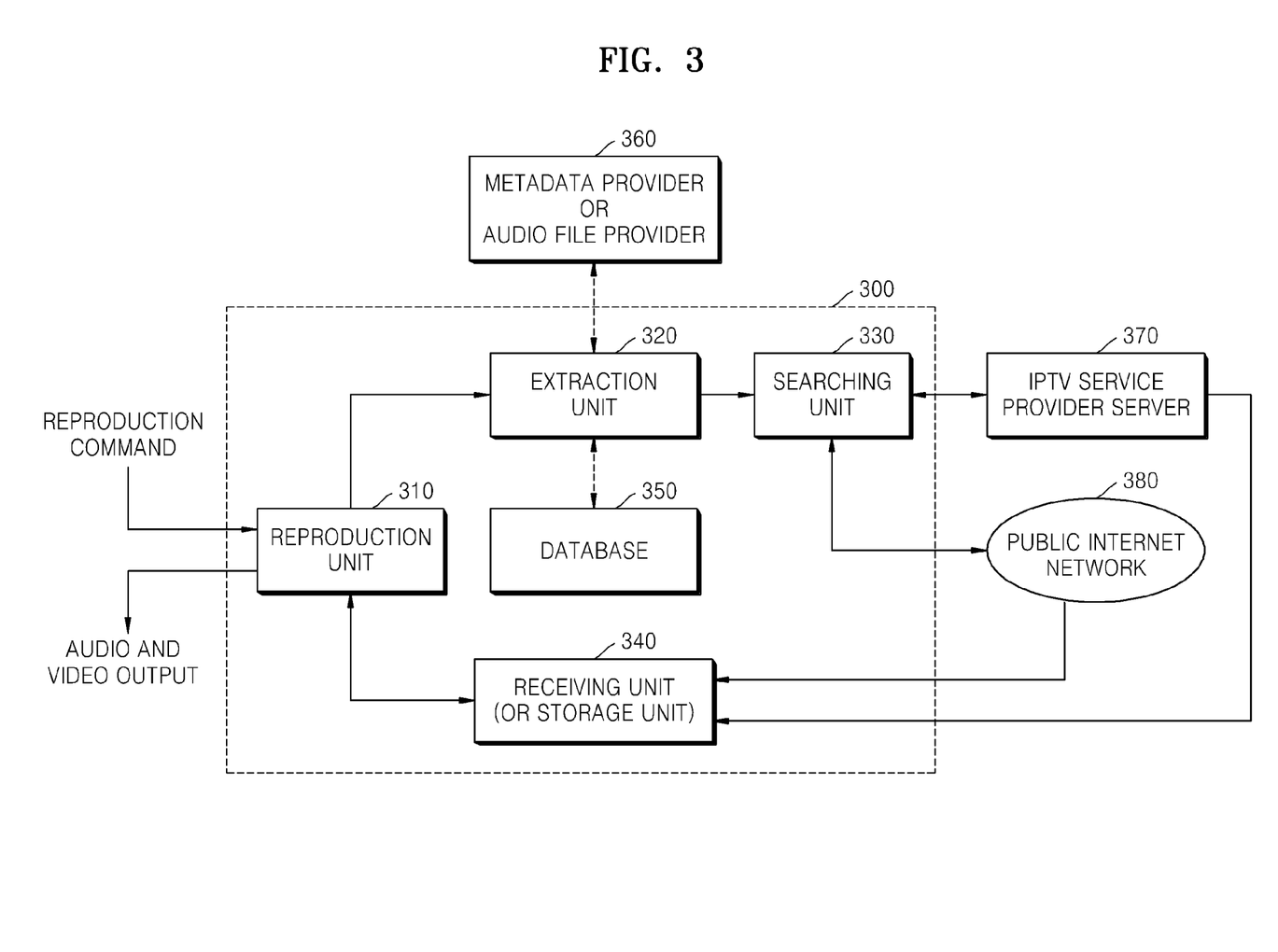
FIG. 3 is a functional block diagram illustrating a content reproduction apparatus in an IPTV terminal according to second to fourth exemplary embodiments of the present invention.

FIG. 3 is a functional block diagram illustrating a content reproduction apparatus in an IPTV terminal according to second to fourth embodiments of the present invention.

Referring to FIG. 3, a content reproduction apparatus 300 in the IPTV terminal includes a reproduction unit 310, an extraction unit 320, a searching unit 330, and a receiving unit 340.

In the second embodiment of the present invention, the extraction unit 320 extracts metadata on audio files stored in a storage device (not shown) in the IPTV terminal before a reproduction command is input from a user to the reproduction unit 310.

The searching unit 330 searches for video content in the IPTV service provider server 370 or the public internet network 380 by using the metadata extracted by the extraction unit 320.

Since operations of the extraction unit 320, the searching unit 330, the database 350, and a metadata provider or an audio file provider 360 are similar to operations of the extraction unit 220, the searching unit 230, the database 260, and the metadata provider or audio file provider 270 except that the metadata is extracted before the reproduction command is received from the user, detailed description on those will be omitted.

The receiving unit 340 receives link information of the video content related to the metadata from the IPTV service provider server 370 or the public internet network 380. The link information of the received video content may be stored in a storage device (not shown) in the receiving unit 340 or stored in the receiving device in the IPTV terminal.

If receiving a reproduction command of an audio file, the reproduction unit 310 receives video content related to the link information through the receiving unit 340 and reproduces the video content in a streaming process.

In the third embodiment, since the extraction unit 320 and the searching unit 330 operate similarly to those in the second embodiment, the detailed description will be omitted.

The receiving unit 340 downloads and stores not only the link information of the video content but the video content from the IPTV service provider server 370 or the public internet network 380. The downloaded video content may be stored in the storage device in the receiving unit 340 or stored in the storage device (not shown) in the IPTV terminal.

If receiving a reproduction command of an audio file, the reproduction unit 310 reproduces the video content through a downloading and storing process.

In the fourth embodiment, if a reproduction command of an audio file is input into the reproduction unit 310 by a user, the extraction unit 320 extracts metadata on the audio file. In the current embodiment, even when a reproduction command is input by the user, the audio file is not immediately reproduced. That is, after the video content is received, the video content is reproduced instead of the audio file. Alternatively, the audio file and a video component of the video content are concurrently reproduced.

The searching unit 330 searches for video content related to the audio file based on the extracted metadata.

The receiving unit 340 receives the video content from the IPTV service provider server 370 or the public internet network 380.

The reproduction unit 310 reproduces the video content received by the receiving unit 340 through a downloading and storing process or a streaming process.

Figure 4:
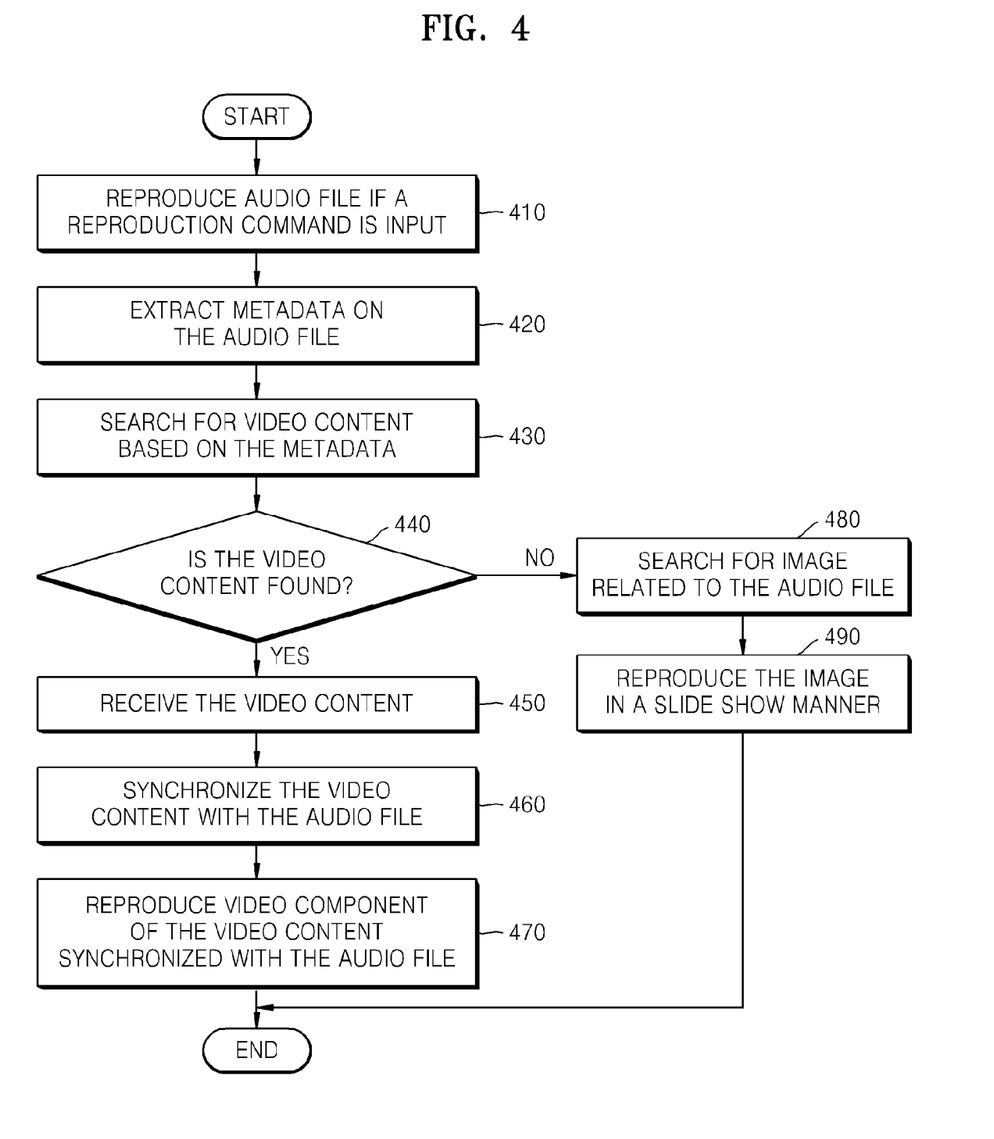
FIG. 4 is a flowchart of a method of reproducing content in an IPTV terminal according to the first embodiment of the present invention.

FIG. 4 is a flowchart of a method of reproducing content in an IPTV terminal according to the first embodiment of the present invention.

Referring to FIG. 4, in operation 410, if a reproduction command of an audio file is input by a user, the audio file is reproduced.

In operation 420, metadata on the audio file is extracted. The metadata may be extracted from the audio file or a separate file from the audio file. The separate file may be stored in the IPTV terminal as a predetermined folder or as a predetermined file so as to conveniently manage a plurality of metadata on a plurality of audio files.

In operation 430, video content related to the audio file is searched for based on the metadata extracted in operation 420. The video content may be searched for in the IPTV service provider or the public internet network through an internet line. The video content related to the audio file includes, for example, a music video, a live broadcasting program, an original sound track video, or a broadcasting advertisement.

In addition, if there are a plurality of video contents found in the IPTV service provider server or the public internet network, only one video content may be received or reproduced based on priority predetermined by the user or based on resolution. For example, if the found video content is a music video or a live broadcasting program of a singer, the music video may only be received and reproduced based on the priority of the user.

In operation 440, if video content is found, the current process proceeds to operation 450. If video content is not found, the current process proceeds to operation 480.

In operation 450, if video content is found in operation 430, the found video content is received. The video content may be received and reproduced through a downloading and storing process or a streaming process.

In operation 460, the video content received in operation 450 is synchronized with the audio file. For example, if the video content is searched for while the audio file is being reproduced, the video content needs to be reproduced from a start point found by jumping a period equal to a period over which the audio file has been reproduced. A content reproduction method in an IPTV terminal according to a modified embodiment may further include an operation of determining whether it is possible to synchronize the video content with the audio file before operation 460. For example, if a difference between the total reproduction time of the audio file and the total reproduction time of the video content is very large, it may be determined that it is impossible to synchronize the video content with the audio file. If it is impossible to synchronize the video content with the audio file, it is possible to proceed to operation 480.

In operation 470, a video component of the video content synchronized with the audio file is reproduced together with the audio file that is already being reproduced. In a modified embodiment, the video component of the video content may be reproduced not with the audio file but with an audio component of the video content.

In operation 480, if the video content is not found, at least one image related to the audio file is searched. In a modified embodiment, a predetermined image stored in the IPTV terminal may be used. In this case, the current process is omitted.

In operation 490, the image searched in operation 480 is reproduced in a slide show manner.

Figure 5:
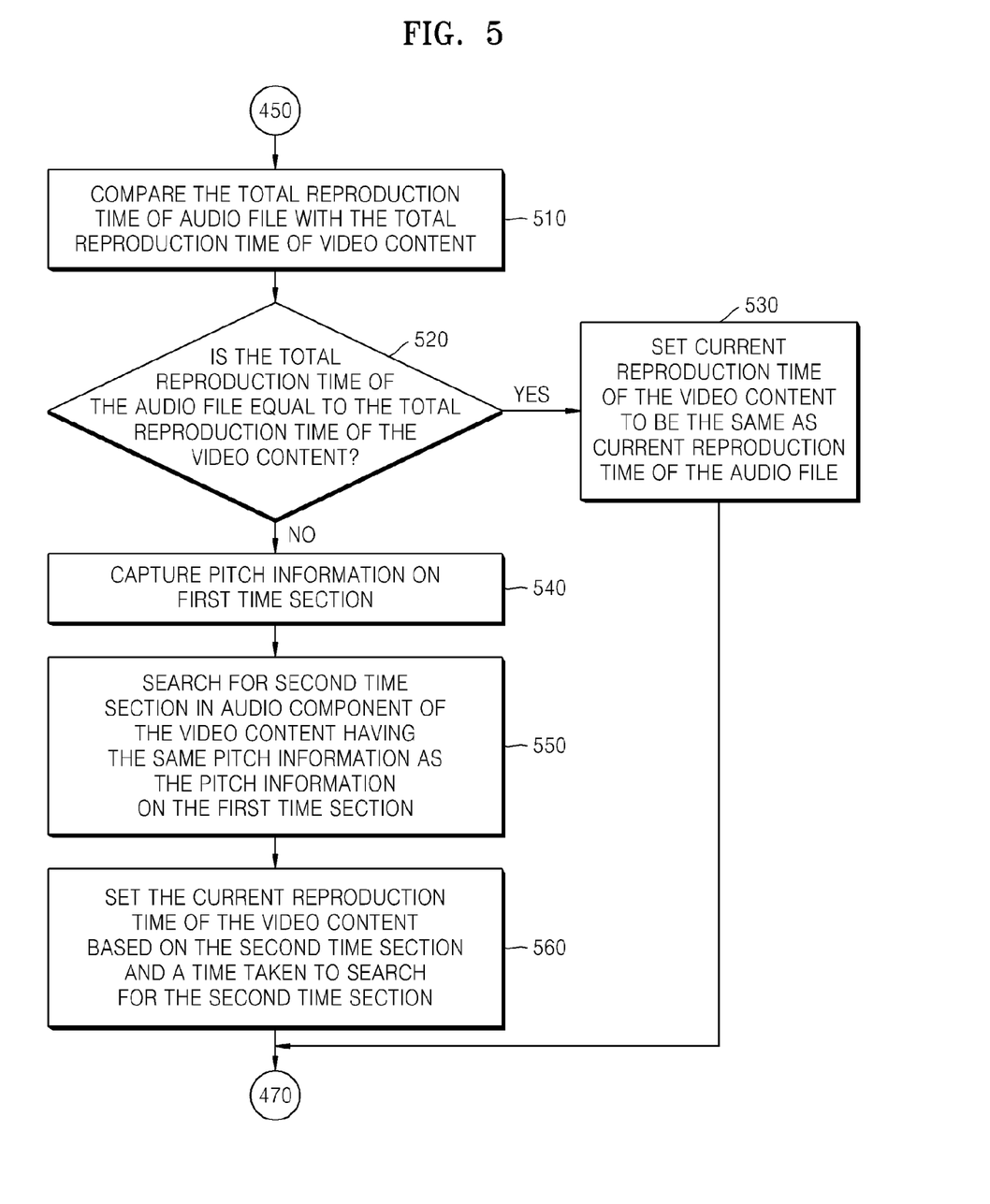
FIG. 5 is a flowchart of an example of a method for synchronizing video content with an audio file according to the first embodiment of FIG. 4.

FIG. 5 is a flowchart of an example of a method for synchronizing video content with an audio file in the first embodiment of FIG. 4.

Referring to FIG. 5, in operation 510, the total reproduction time of the audio file is compared with the total reproduction time of the video content.

In operation 520, if the total reproduction time of the audio file is the same as the total reproduction time of the video content, the current process proceeds to operation 530. Otherwise, the current process proceeds to operation 540. In a modified embodiment, if it is determined that the total reproduction time of the audio file is not exactly the same as the total reproduction time of the video content but substantially the same as the total reproduction time of the video content, it is possible to proceed to operation 530.

In operation 530, if the total reproduction time of the audio file is the same as the total reproduction time of the video content, the current reproduction time of the video content is set so as to be the same as the current reproduction time of the audio file. The video component of the video content is reproduced starting from the current reproduction time set in the current process.

In operation 540, if the total reproduction time of the audio file is different from the total reproduction time of the video content, pitch information on a first time section, between a time that is a predetermined reference time earlier than the current reproduction time and the current reproduction time of the audio file, is captured. The section in which the pitch information on the audio file is captured is not limited to the aforementioned time section. Various changes may be made. In addition, the predetermined reference time may be predetermined by a user.

In operation 550, a second time section of the audio component of the video content having the same pitch information as the pitch information on the first time section of the audio file is searched.

In operation 560, the current reproduction time of the video content is set based on the second time section and a time taken to search for the second time section. This is because time has elapsed while searching for the second time section in operation 550 and so the current reproduction time of the audio file has increased. For example, in operation 540, the first time section ranges from thirty seconds to forty seconds (that is, the current reproduction time is forty seconds, and the reference time is ten seconds). If it takes five seconds to search for the second time section, the current reproduction time of the video content is forty five seconds.

Figure 6:
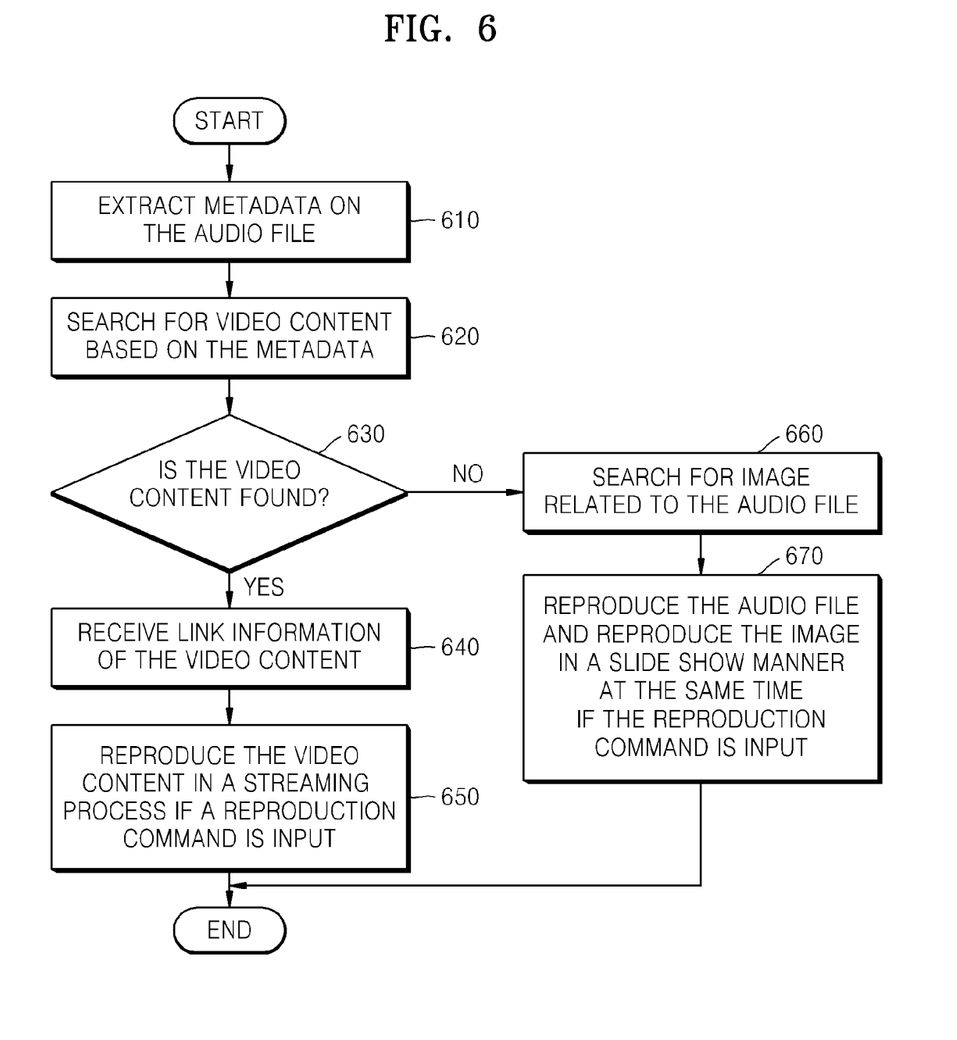
FIG. 6 is a flowchart of a method of reproducing content in an IPTV terminal according to the second embodiment of the present invention.

FIG. 6 is a flowchart of a method of reproducing content in an IPTV terminal according to the second embodiment of the present invention.

Referring to FIG. 6, in operation 610, metadata on an audio file is extracted before a reproduction command is input. The audio file may be previously stored in the IPTV terminal or provided by an audio file provider. The metadata may be extracted from the audio file or a separate file from the audio file.

In operation 620, video content related to the audio file is searched for based on the extracted metadata.

In operation 630, if video content related to the audio file is found, the current process proceeds to operation 640. If video content related to the audio file is not found, the current process proceeds to operation 660.

In operation 640, if video content has been found in operation 630, link information of the video content is received. The received link information is stored in the IPTV terminal.

In operation 650, if the reproduction command of the audio file is input, the video content (video and audio components) is reproduced in a streaming process based on the link information of operation 640. In this case, the audio file is not reproduced.

In operation 660, if the video content has not been found, an image related to the audio file is searched for and received. In a modified embodiment, if there is a predetermined image stored in the IPTV terminal, the current operation may be omitted.

In operation 670, if the reproduction command of the audio file is input, the audio file is reproduced and the image in operation 660 is reproduced in a slide show manner at the same time.

Figure 7:
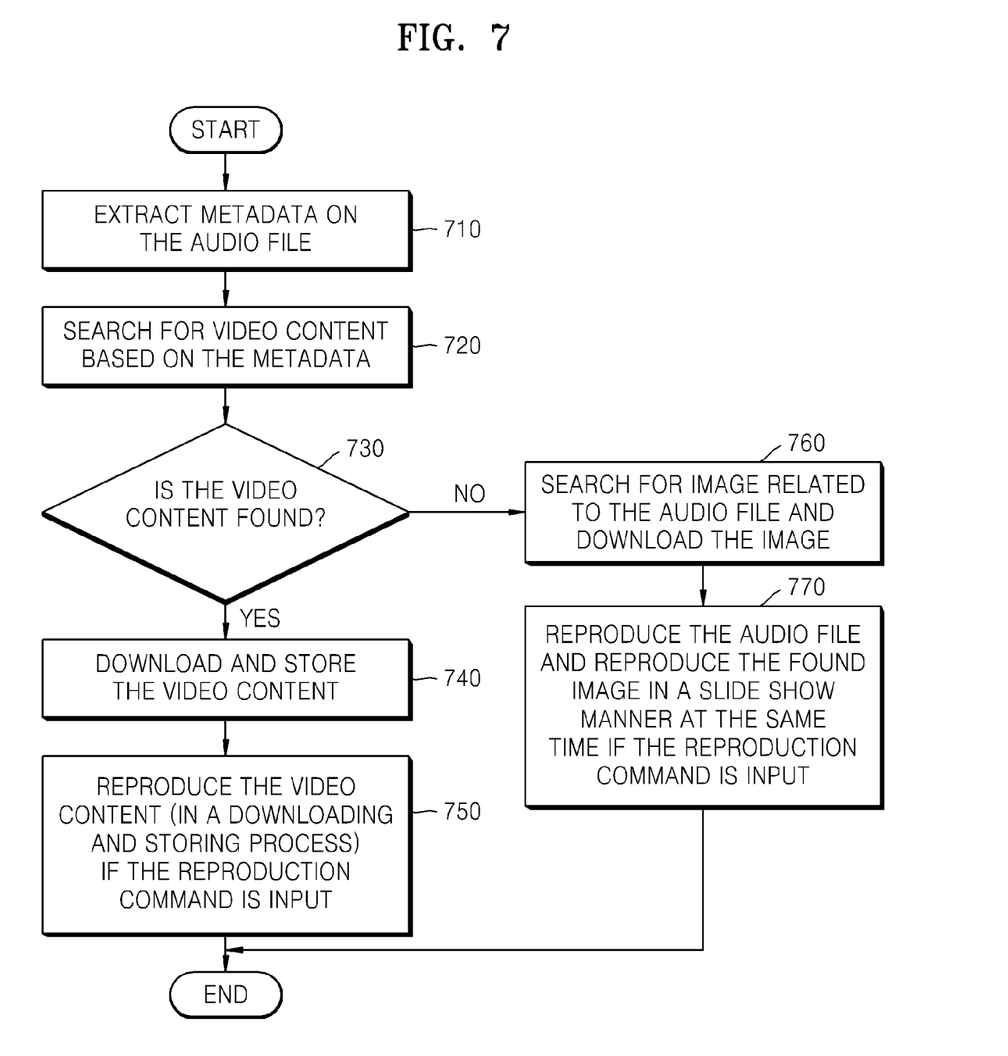
FIG. 7 is a flowchart of a method of reproducing content in an IPTV terminal according to the third embodiment of the present invention.

FIG. 7 is a flowchart of a method of reproducing content in an IPTV terminal according to the third embodiment of the present invention.

Referring to FIG. 7, since operations 710 to 730 are similar to operations 610 to 630 of FIG. 6, an additional description will be omitted.

In operation 740, if there is video content found in operation 730, the video content is downloaded and stored.

In operation 750, if the reproduction command of the audio file is input, the video content (video and audio components) is reproduced through a downloading and storing process.

In operation 760, if the video content is not found, an image related to the audio file is searched for and downloaded. If there is a predetermined image stored in the IPTV terminal, the current operation may be omitted.

In operation 770, if a reproduction command of an audio file is input, the audio file is reproduced, and the image downloaded in operation 760 is reproduced in a slide show manner, at the same time.

Figure 8:
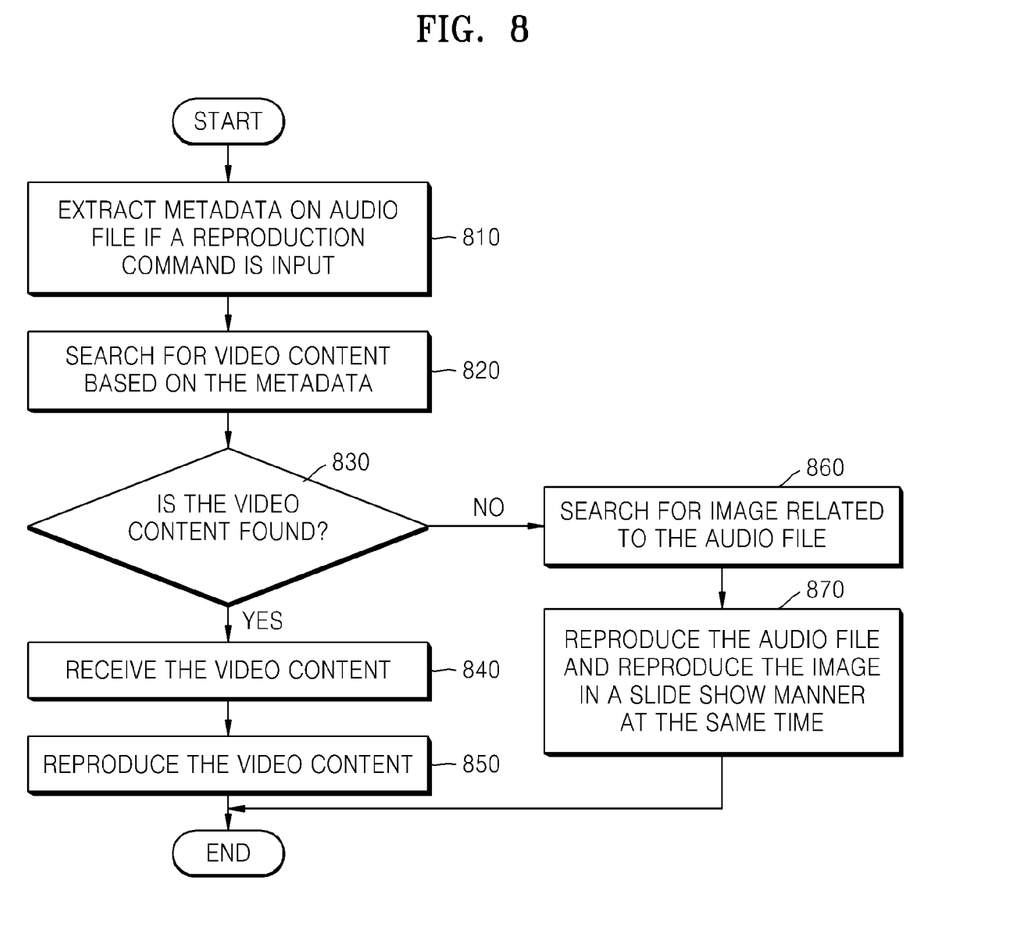
FIG. 8 is a flowchart of a method of reproducing content in an IPTV terminal according to the fourth embodiment of the present invention.

FIG. 8 is a flowchart of a method of reproducing content in an IPTV terminal according to the fourth embodiment of the present invention.

Referring to FIG. 8, in operation 810, if a reproduction command of an audio file is input from a user, metadata on the audio file is extracted. In the current operation, reproduction of the audio file does not start.

In operation 820, video content related to the audio file is searched for based on the metadata extracted in operation 810.

In operation 830, if video content is found, the current process proceeds to operation 840. If video content is not found, the current process proceeds to operation 860.

In operation 840, if video content has been found in operation 820, the found video content is received. The video content may be received and reproduced through a downloading and storing process or a streaming process, in various embodiments.

In operation 850, the video content (video and audio components) received in operation 840 is reproduced.

In operation 860, if video content has not been found, an image related to the audio file is searched for. If a predetermined image stored in the IPTV terminal is used, the current operation will be omitted.

In operation 870, the audio file is reproduced and the image found in operation 860 is reproduced in a slide show manner at the same time.

A program for implementing a content reproduction method in the IPTV terminal according to an embodiment of the present invention can also be embodied as computer readable codes on a computer readable recording medium or on a computer readable transmission medium. The computer readable recording medium is any data storage device that can store data which can be thereafter be read by a computer system. Examples of the computer readable recording medium include read-only memory (ROM), random-access memory (RAM), CD-ROMs, magnetic tapes, floppy disks, and optical data storage devices. An example of computer readable transmission media is carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A content reproduction method comprising:
    reproducing an audio file, if a reproduction command of the audio file is input;
    extracting metadata on the audio file;
    searching for video content related to the audio file based on the metadata; and
    receiving the video content,
    wherein in the searching for the video content, if a plurality of video contents are found, one of the video contents is selected based on resolution.

2. The content reproduction method of claim 1, wherein in the receiving of the video content, the video content is received through a downloading and storing process or a streaming process.

3. The content reproduction method of claim 1, wherein in the extracting of the metadata on the audio file, the metadata is extracted from the audio file or a separate file from the audio file.

4. The content reproduction method of claim 1, wherein in the searching for the video content, the video content is searched for in an Internet Protocol Television (IPTV) service provider server or a public internet network.

5. The content reproduction method of claim 1, wherein in the searching for the video content, the video content is any one of a music video, a live broadcasting program, an original sound track video, and a broadcasting advertisement.

6. The content reproduction method of claim 5, wherein in the searching for the video content, if the video content is not found, at least one image related to the audio file is found, and the at least one image is reproduced in a slide show manner.

7. The content reproduction method of claim 1, further comprising:
synchronizing the video content with the audio file; and
reproducing a video component of the video content synchronized with the audio file.

8. The content reproduction method of claim 7, wherein the synchronizing of the video content with the audio file includes:
comparing a total reproduction time of the audio file with a total reproduction time of the video content;
capturing pitch information on a first time section between a time that is a predetermined time earlier than a current reproduction time and a current reproduction time of the audio file, if the total reproduction time of the audio file is different from the total reproduction time of the video content;
searching an audio component of the video content for a second time section having the same pitch information as the pitch information of the first time section; and
setting a current reproduction time of the video content based on the second time section and a time taken to search for the second time section.

9. The content reproduction method of claim 1, wherein the video component of the video content is reproduced together with the audio file or together with an audio component of the video content.

10. The content reproduction method of claim 7, wherein the synchronizing of the video content with the audio file includes:
comparing a total reproduction time of the audio file with a total reproduction time of the video content; and
setting a current reproduction time of the video content to be the same as a current reproduction of the audio file, if the total reproduction time of the audio file is the same as the total reproduction time of the video content.

11. The method according to claim 1, further comprising acquiring extractable information on the audio file and receiving metadata.

12. A content reproduction method comprising:
extracting metadata on an audio file;
searching for video content related to the audio file based on the metadata,
if a plurality of video contents are found, selecting one of the video contents based on resolution;
receiving link information of the video content; and
reproducing the video content in a streaming process based on the link information if a reproduction command of the audio file is input.

13. The content reproduction method of claim 12, wherein in the extracting of the metadata on the audio file, the metadata is extracted from the audio file or a separate file from the audio file.

14. The content reproduction method of claim 12, further comprising:
searching for and receiving at least one image related to the audio file if the video content is not found; and
reproducing the audio file and reproducing the at least one image in a slide show manner at the same time, if the reproduction command of the audio file is input.

15. A content reproduction method comprising:
extracting metadata on an audio file;
searching for video content related to the audio file based on the metadata;
if a plurality of video contents are found, selecting one of the video contents based on resolution
downloading and storing the video content; and
reproducing the video content if a reproduction command of the audio file is input.

16. The content reproduction method of claim 15, wherein in the extracting of the metadata on the audio file, the metadata is extracted from the audio file or a separate file from the audio file.

17. The content reproduction method of claim 15, further comprising:
searching for and downloading at least one image related to the audio file if the video content is not found; and
reproducing the audio file and reproducing the at least one image in a slide show manner at the same time, if the reproduction command of the audio file is input.

18. A content reproduction method comprising:
extracting metadata on an audio file if a reproduction command of the audio file is input;
searching for video content related to the audio file based on the metadata;
if a plurality of video contents are found, selecting one of the video contents based on resolution
receiving the video content; and
reproducing the video content.

19. The content reproduction method of claim 18, wherein in the receiving of the video content, the video content is received through a downloading and storing process or a streaming process.

20. A content reproduction apparatus comprising:
a processor which comprises:
a reproduction unit which reproduces an audio file if a reproduction command of the audio file is input;
an extraction unit which extracts metadata on the audio file;
a searching unit which searches for video content related to the audio file based on the metadata; and
a receiving unit which receives the video content,
wherein if a plurality of video contents are found, the searching unit selects one of the video contents based on resolution.

21. A content reproduction apparatus of claim 20, further comprising
a synchronization unit which synchronizes the video content with the audio file,
wherein the reproduction unit reproduces a video component of the video content synchronized with the audio file.

22. A content reproduction apparatus comprising:
a processor which comprises:
an extraction unit which extracts metadata on the audio file;
a searching unit which searches for video content related to the audio file based on the metadata;
a receiving unit which receives link information of the video content; and
a reproduction unit which receives the video content via the receiving unit and reproduces the video content in a streaming process if a reproduction command of the audio file is input, wherein if a plurality of video contents are found, the searching unit selects one of the video contents based on resolution.

23. A content reproduction apparatus comprising:
an extraction unit which extracts metadata on an audio file;
a searching unit which searches for video content related to the audio file based on the metadata;
a storage unit which downloads and stores the video content; and
a reproduction unit which reproduces the video content if a reproduction command of the audio file is input,
wherein if a plurality of video contents are found, the searching unit selects one of the video contents based on resolution.

24. A content reproduction apparatus comprising:
a processor which comprises:
an extraction unit which extracts metadata on an audio file if a reproduction command of the audio file is input;
a searching unit which searches for video content related to the audio file based on the metadata;
a receiving unit which receives the video content; and
a reproduction unit which reproduces the video content,
wherein if a plurality of video contents are found, the searching unit selects one of the video contents based on resolution.

25. A non-transitory computer-readable recording medium having embodied thereon a computer program for executing a content reproduction method, the content reproduction method comprising:
reproducing an audio file if a reproduction command of the audio file is input;
extracting metadata on the audio file;
searching for video content related to the audio file based on the metadata if a plurality of video contents are found, selecting one of the video contents based on resolution; and
receiving the video content.

26. A non-transitory computer-readable recording medium having embodied thereon a computer program for executing a content reproduction method, the content reproduction method comprising:
extracting metadata on an audio file;
searching for video content related to the audio file based on the metadata;
if a plurality of video contents are found, selecting one of the video contents based on resolution;
receiving link information of the video content; and
reproducing the video content in a streaming process based on the link information if a reproduction command of the audio file is input.

27. A non-transitory computer-readable recording medium having embodied thereon a computer program for executing a content reproduction method, the content reproduction method comprising:
extracting metadata on an audio file;
searching for video content related to the audio file based on the metadata;
if a plurality of video contents are found, selecting one of the video contents based on resolution
downloading and storing the video content; and
reproducing the video content, if a reproduction command of the audio file is input.

28. A non-transitory computer-readable recording medium having embodied thereon a computer program for executing a content reproduction method, the content reproduction method comprising:
extracting metadata on an audio file if a reproduction command of the audio file is input;
searching for video content related to the audio file based on the metadata;
if a plurality of video contents are found, selecting one of the video contents based on resolution
receiving the video content; and
reproducing the video content.

* * * * *